Figure 1:
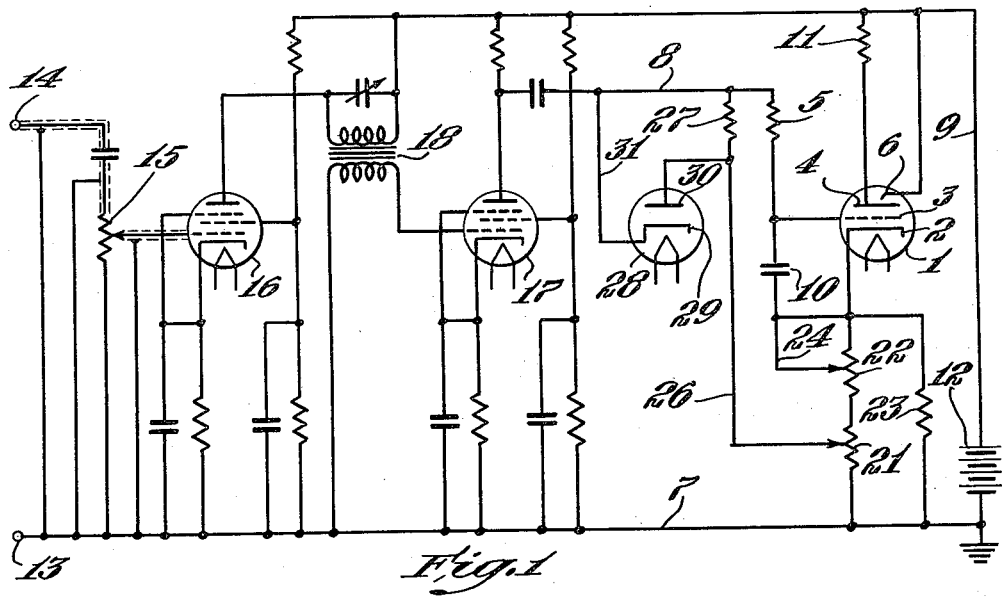

Feb. 21, 1950  H. D. HALL  2,498,490
VOLTAGE INDICATING DEVICE
Filed Nov. 9, 1944

Inventor
Henry D. Hall
by Roberts, Cushman & Groover
attys.

Patented Feb. 21, 1950

2,498,490

UNITED STATES PATENT OFFICE 2,498,490

VOLTAGE INDICATING DEVICE

Henry D. Hall, Concord, Mass., assignor to Harvey Radio Laboratories, Inc., Cambridge, Mass., a corporation of Massachusetts Application November 9, 1944, Serial No. 562,729

5 Claims. (Cl. 177—311)

This invention relates to devices for detecting small differences of potential, as for example those encountered in an alternating current bridge, and more particularly to devices employing an electron-ray tube of the type having a cathode, plate, grid, target and a ray-control electrode producing a variable-width non-fluorescent zone on the target in response to variations in grid voltage, the grid and cathode being connected to the bridge so that the grid voltage varies as the bridge is balanced, that is when the bridge is substantially balanced, it being frequently impossible to balance an alternating current bridge perfectly. A tube of this kind is known as a magic eye and the variation in width of the non-fluorescent zone is known as opening and closing of the eye.

Heretofore it has been proposed to connect the bridge to the tube so that the grid voltage is caused to fluctuate at a frequency corresponding to that of the bridge source, the voltage of the grid being such that the eye is normally open. When the bridge is unbalanced the width of the non-fluorescent zone varies at the aforesaid frequency, causing the edges of the zone to appear fuzzy. As the bridge approaches balance the fuzziness decreases. Thus the only way to determine when the bridge is balanced is to note when the fuzziness is minimum. This is very difficult to do and consequently this prior arrangement has not afforded accurate determinations.

It has also been proposed to interpose a rectifier between the amplifier and tube so that the input signal delivered to the grid is largely or wholly unidirectional, the grid normally having zero bias so that the eye is wide open (e. g. open 90°) and the rectifier being connected so that the rectified input signal tends to close the eye by making the grid negative. This arrangement is also unsatisfactory for the reason that the eye is wide open when the bridge is balanced and it is difficult to determine when the opening is maximum, the ordinary operator being incapable of distinguishing between different angles when they are of the order of 90°.

Objects of the present invention are to produce a device of the aforesaid type which affords accurate indications, which can be adjusted quickly and easily, which is easy to read, which is simple and economical in construction and which is durable and reliable in use, and to provide an improved method of using an electron-ray tube for the aforesaid purpose.

In one aspect the invention involves a method of detecting alternating current signal with an electron-ray eye having a cathode, plate, grid, target and ray-control electrode, which comprises negatively biasing the grid so that the eye is normally closed, rectifying the alternating current, and transmitting the rectified current to the grid in the direction to counteract said negative bias, whereby the rectified current opens the eye. By setting the bias of the grid so that the eye is normally closed, the eye opens in response to the rectified input signal owing to the manner in which the rectifier is connected in the input circuit. Thus when connected to an alternating current bridge the eye tends to close as the bridge approaches balance, and when the bridge is balanced the eye is closed without overlapping. This affords accurate determinations without difficulty for the reason that it is easy to distinguish between a zero angle and a small angle, even though the small angle be minute.

The electrodes of the electron-ray eye may all be enclosed in a single tube, as for example in the so-called indicator type with triode unit, or some of them may be enclosed in one tube and the rest in another tube, as in the so-called twin-indicator type where the cathode, plate and grid are in one tube and the target, ray-control electrode and a second cathode are in a second tube.

In another aspect the invention involves apparatus for detecting an alternating current signal comprising an electron-ray eye having a cathode, plate, grid, target and ray-control electrode, means for negatively biasing the grid, an input circuit to receive said signal, and means including a rectifier for causing the input signal to counteract the negative bias, whereby the rectified input signal opens the eye when the grid bias is adjusted normally to close the eye. The rectifier is preferably connected in parallel with a resistor located in a branch circuit across the input circuit. In the preferred embodiment one side of the input circuit is connected through a resistor to the cathode and the second side is connected through a resistance to the grid. The grid may be adjustably biased by connecting a source of direct current to the cathode in series with the aforesaid resistor and connecting an adjustable tap on the resistor through a branch circuit to the second side of the input circuit. To permit full range of adjustment of the aforesaid tap without cutting out all the resistance in the direct current circuit, a second resistor is connected in series with the first resistor, the second resistance preferably being adjustable to facilitate the initial adjustment of the grid bias. By connecting a third resistor in parallel with the aforesaid resistors, the resistance of the first two may be higher, thereby reducing their initial cost and prolonging their life. In the preferred embodiment a condenser is connected between the grid and cathode, preferably directly. The aforesaid source of direct current preferably serves not only to bias the grid but also to supply the plate current of the electron-ray tube, in which case its positive end is connected to the plate of the tube. While the direct current supply source may be a battery or other generator it is preferably an electronic rectifier with appropriate filtering circuits.

Figures 2, 3:
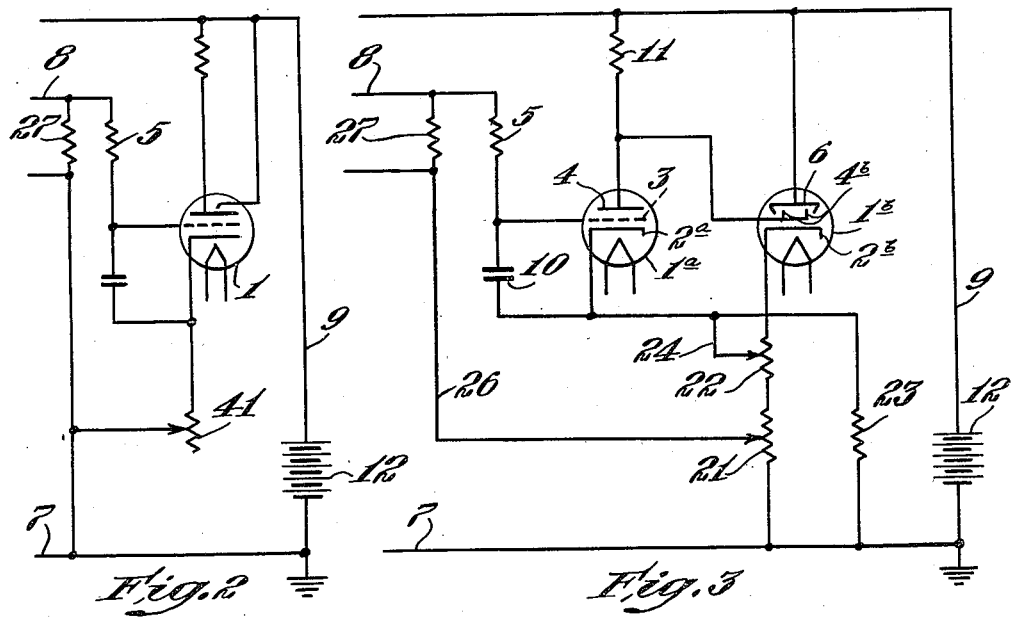

For the purpose of illustration typical embodiments of the invention are shown in the accompanying drawings in which Fig. 1 is a circuit diagram of the preferred arrangement; and Figs. 2 and 3 are circuit diagrams of two of the many possible modifications.

The particular embodiment of the invention shown in Fig. 1 comprises an electron-ray tube 1 having a cathode 2, grid 3, plate 4 and target 6, the cathode and grid being connected to the opposite sides of an input circuit 7—8, and the cathode and plate being connected to a supply circuit 9 containing a resistor 11 and a suitable source of direct current 12 which has its negative terminal connected to the cathode. The second side 8 of the input circuit contains a resistor 5, and a condenser 10 is connected between the cathode 2 and the grid 3. While the input circuit 7—8 may be connected directly to the alternating current bridge or other source of potential to be detected, it is preferably connected through an amplifier to the input terminals 13 and 14. The typical amplifier shown in Fig. 1 comprises amplifier tubes 16 and 17, transformer 18 and the usual resistors and condensers, the primary of the transformer being tuned to the frequency at which the bridge is operated. Included in the amplifier circuit is a sensitivity controller 15 having an adjustable tap leading to the grid of tube 16.

According to the present invention two resistors 21 and 22 are connected in that portion of the circuit which is common to the input side 7 and the supply circuit 9 and a third resistor 23 is connected in parallel with the two resistors 21 and 22. A stabilizing resistor may also be connected between the cathode and the positive side of the direct current source but ordinarily this is unnecessary. The resistor 22 is made adjustable by means of an adjustable tap which short-circuits a part of the resistance through the conductor 24.

Leading from an adjustable tap on the resistor 21 is a branch circuit 26 containing a resistor 27. Connected in parallel with the resistor 27 is a rectifying tube 28 having a cathode 29 and a plate 30, the cathode being connected through conductor 31 to the second side 8 of the input circuit so that the rectified input signal tends to make the grid positive. While the component values may vary widely, the following values are recommended when using an electron-ray tube of the 6E5 type and a source 12 of 250 volts: resistor 5, .1 megohm; resistor 11, 1.0 megohm; resistor 21, 50,000 ohms; resistor 22, 50,000 ohms; resistor 23, 12,000 ohms; resistor 27, 1.0 megohm; and condenser 10, .5 microfarad.

As described above the bias on grid 3 is made sufficiently negative to close the eye without overlapping when no signal is received through the terminals 13 and 14. Then when the signal is received the rectified impulse, being positive owing to the aforesaid connection of the rectifier, makes the grid bias less negative, thereby opening the eye. The negative bias is preferably set to close the eye by first adjusting resistor 22 and then adjusting resistor 21, the sensitivity controller being reset in the course of the adjustment if necessary. By providing the second resistor 22, the resistor 21 may be utilized throughout its full range without cutting out all the adjustable resistance. Ordinarily the adjustment of resistor 22 need be changed only occasionally, as when replacing tube 1, so that the resistor may be of the type operated by a screw driver.

The modification shown in Fig. 2 differs from that of Fig. 1 in that resistors 22 and 23 have been omitted and the resistor 41, corresponding to 21 in Fig. 1, is connected to the supply circuit 9 through the adjustable tap. While this arrangement gives fairly satisfactory results it is not as good as that shown in Fig. 1 for various reasons. One reason is that the current in the supply circuit flows through the adjustable tap, which may cause erratic action. Another reason is that adjustment of the resistor 41 varies the potential across the tube 1. And without the resistor 22 all of the resistance of 41 is not available for adjustment because all of the resistance in this circuit should not be cut out. For most purposes the resistance of 41 should be approximately 10,000 ohms.

The modification shown in Fig. 3 is like that shown in Fig. 1 except in that the electron-ray eye of the indicator type with triode unit has been replaced with one of the so-called twin indicator type. Instead of the single tube 1 it comprises two tubes 1a and 1b, instead of one cathode 2 it has two cathodes 2a and 2b connected together by a conductor extending from one tube to the other, and instead of having its ray-control electrode connected to the plate 4 inside tube 1 it has two ray-control electrodes 4b in tube 1b connected to plate 4 in tube 1a through a conductor extending from one tube to the other. The operation of this modification is precisely the same as the arrangement shown in Fig. 1 except in that the eye has two non-fluorescent zones which vary in width synchronously. Obviously one of the twin ray-control electrodes may be omitted if desired.

It should be understood that the present disclosure is for the purpose of illustration only and that this invention includes all modifications and equivalents which fall within the scope of the appended claims.

I claim:

1. Apparatus for detecting an alternating current signal comprising an electron-ray eye having a cathode, plate, grid, target and ray-control electrode, an input circuit having one side connected through resistor means which tends negatively to bias said grid to said cathode and the second side connected through a resistance to said grid, a condenser, a branch circuit leading from the cathode through the condenser to said second side between said resistance and grid, a second branch circuit leading from an adjustable tap on said first resistor to said second side, a second resistor in said second branch circuit, and a rectifier in parallel with said second resistor, the cathode of said rectifier being connected to said second side so that the rectified input signal tends to make the grid positive, and means including the rectifier for causing the input signal to counteract said negative bias, whereby the rectified input signal opens the eye when the grid bias is adjusted normally to close the eye.

2. Apparatus for detecting an alternating current signal comprising an electron-ray eye having a cathode, plate, grid, target and ray-control electrode, an input circuit having one side connected through first and second resistors to said cathode and the second side connected through a resistance to said grid, a condenser, a branch circuit leading from the cathode through said condenser and thence to said second side between said resistance and grid, a second branch circuit leading from an adjustable tap on said first resistor to said second side said tap applying a negative bias to said grid, said second resistor being adjustable, a third resistor in said second branch circuit, and a rectifier in parallel with said third resistor, the cathode of said rectifier being connected to said second side so that the rectified input signal tends to make the grid positive, whereby the rectified input signal opens the eye when the grid bias is adjusted normally to close the eye.

3. Apparatus for detecting an alternating current signal comprising an electron-ray eye having a cathode, plate, grid, target and ray-control electrode, an input circuit having one side connected through first and second resistors to said cathode and the second side connected through a resistance to said grid, a third resistor in parallel with said resistors, a supply circuit containing a source of direct current with its negative end connected to the cathode through said resistors and its positive end connected to said plate, a condenser, a branch circuit leading from the cathode through said condenser and thence to said second side between said resistance and grid, a second branch circuit leading from an adjustable tap on said first resistor to said second side and applying a negative bias to said grid, a fourth resistor in said second branch circuit, and a rectifier in parallel with said fourth resistor, the cathode of said rectifier being connected to said second side so that the rectified input signal tends to make the grid positive, whereby the rectified input signal opens the eye when the grid bias is adjusted normally to close the eye.

4. Apparatus for detecting an alternating current signal comprising an electron-ray eye tube with cathode, anode, grid and target, a source for supplying the anode circuit of said tube, resistance means connected between said cathode and a terminal of said source, means for applying said signal between said grid and said terminal, and connected between a tap of said resistance means and said grid a resistor and in parallel thereto current valve means conducting substantially only in the direction from said tap to said grid, said resistor tending under normal operating conditions to apply from said tap a negative bias to said grid and said valve means tending upon application of said signal to introduce across said resistor a voltage which opposes said bias.

5. Apparatus according to claim 4 further characterized in that said valve means is a diode whose cathode is connected to said grid, and the value of said resistor is large as compared to that of said resistance means.

HENRY D. HALL.

REFERENCES CITED

The following references are of record in the file of this patent:

UNITED STATES PATENTS

| Number | Name | Date |
|---|---|---|
| 2,263,932 | Schnoll | Nov. 25, 1941 |
| 2,272,849 | Perkins | Feb. 10, 1942 |
| 2,291,648 | Rider et al. | Aug. 4, 1942 |

OTHER REFERENCES

"Universal Measuring Instrument," by Hay, published in Wireless World, May 1944, pp. 130–132.